March 29, 1960  H. A. TRUMPLER  2,930,940
INTERLOCKING MECHANISM FOR ENCLOSED CIRCUIT CONTROL
Filed Feb. 6, 1957  3 Sheets-Sheet 1
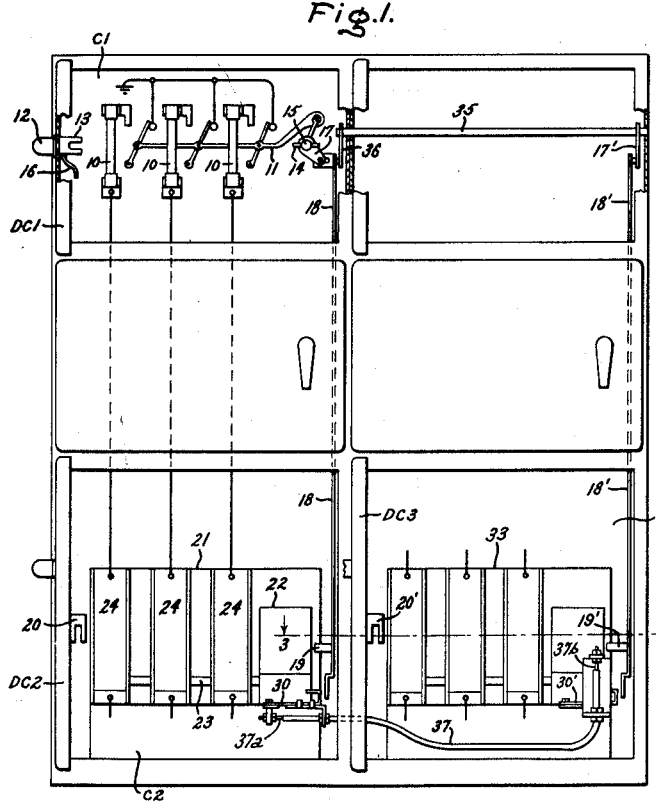
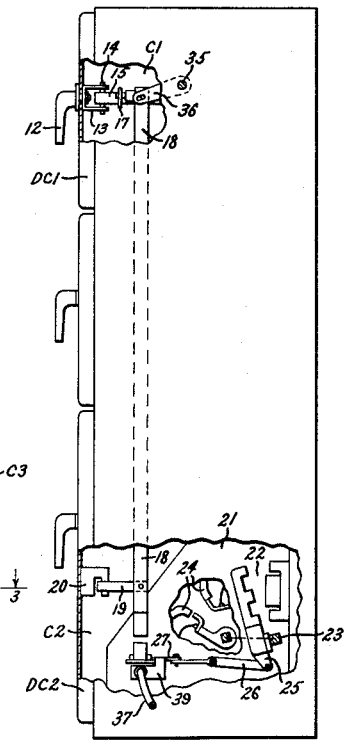
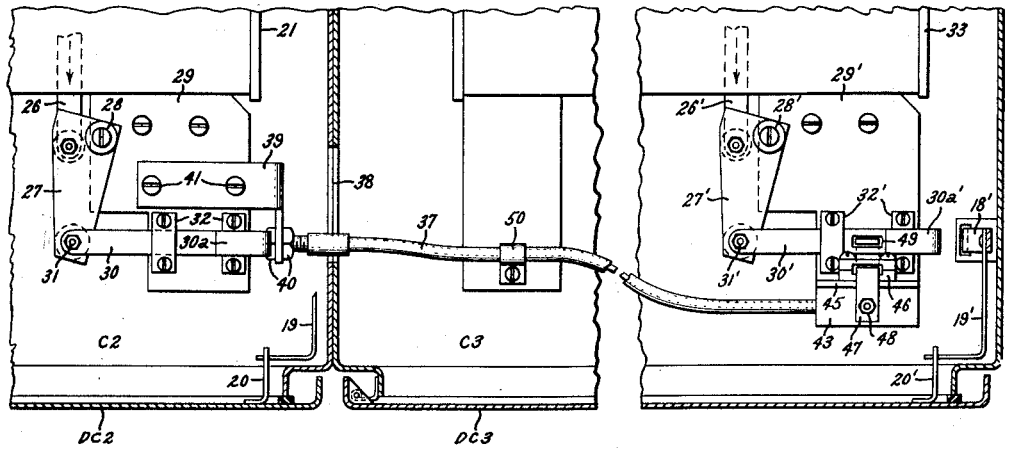
Inventor:
Henry A. Trumpler,
by Irving H. Marshman
His Attorney.

March 29, 1960     H. A. TRUMPLER     2,930,940
INTERLOCKING MECHANISM FOR ENCLOSED CIRCUIT CONTROL
Filed Feb. 6, 1957     3 Sheets-Sheet 2
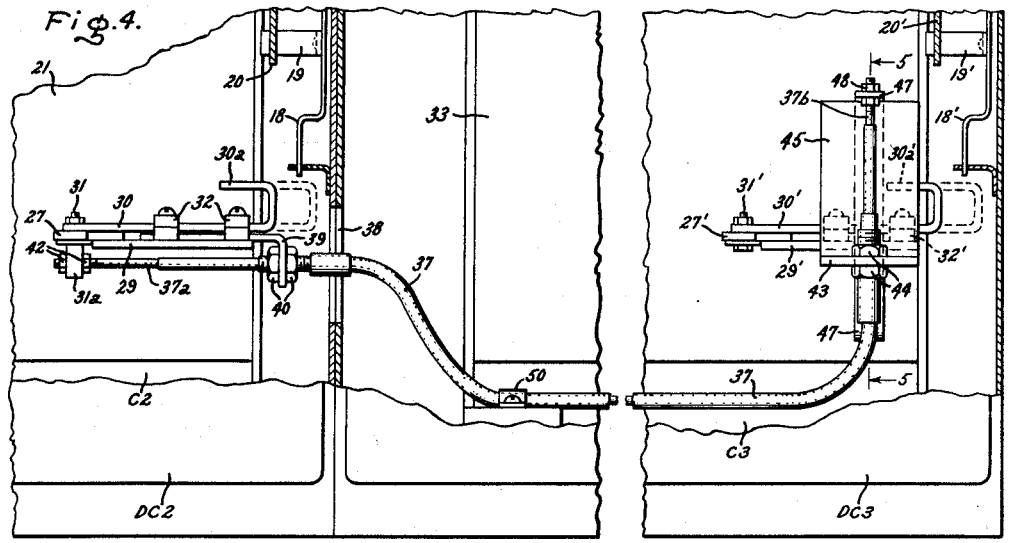
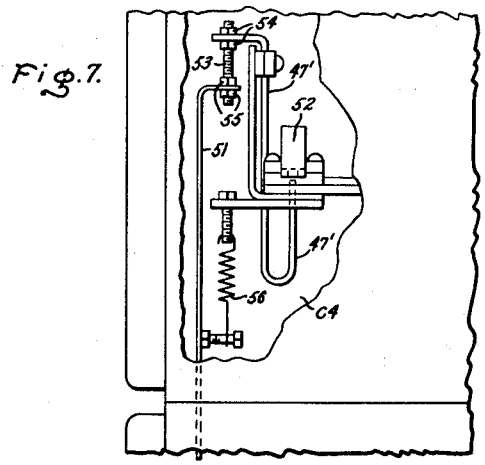
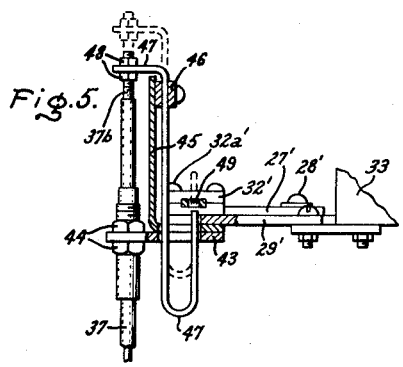
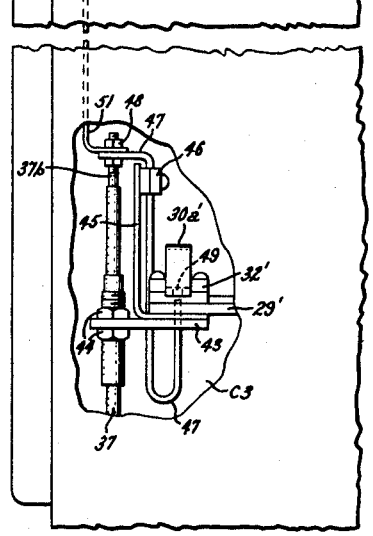
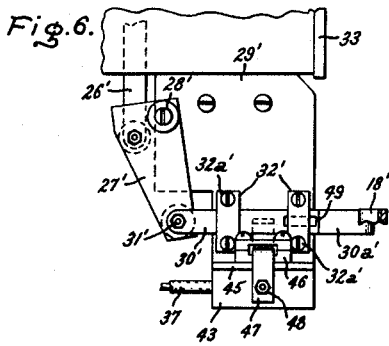
Inventor:
Henry A. Trumpler,
by Irving H. Marshman
His Attorney.

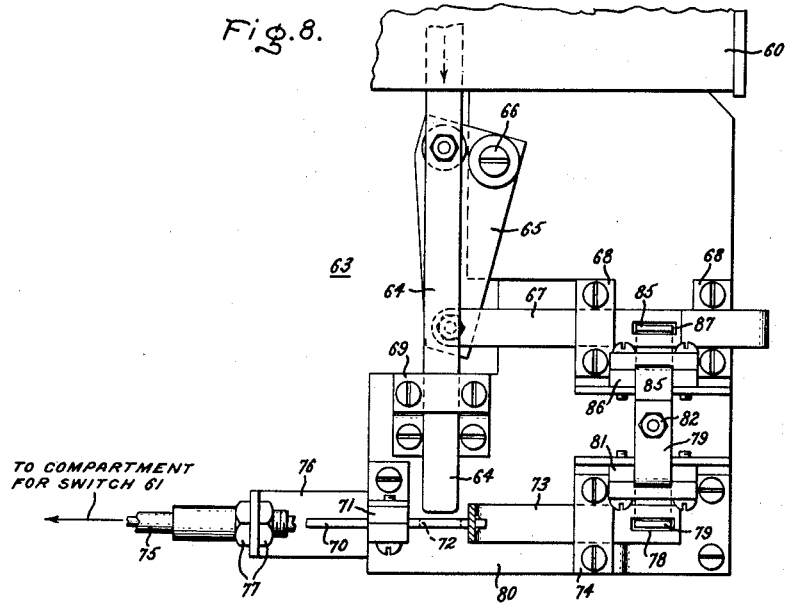
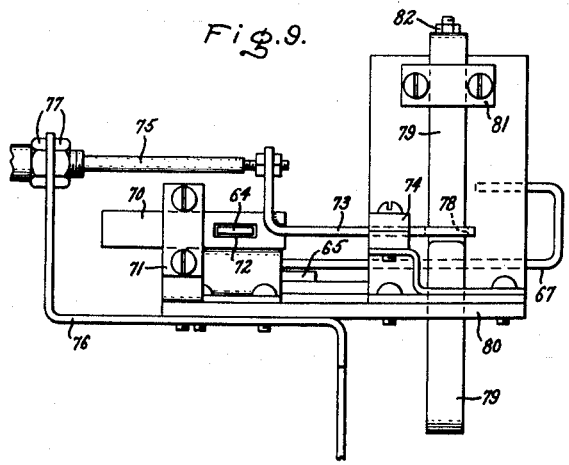

United States Patent Office

2,930,940
Patented Mar. 29, 1960

2,930,940

INTERLOCKING MECHANISM FOR ENCLOSED CIRCUIT CONTROL

Henry A. Trumpler, Schenectady, N.Y., assignor to General Electric Company, a corporation of New York Application February 6, 1957, Serial No. 638,618

10 Claims. (Cl. 317—99)

This invention relates to interlocking mechanism for circuit control equipment, particularly for safeguarding circuit control switches of the enclosed type, having separate access doors.

The principal object of the invention is the provision of an improved versatile double function form of combined access door and switch interlocking mechanism suitable for varying forms of alternative or selective circuit switching and control equipment of the modern industrial type enclosed in metal cabinets for the protection of the equipment as well as the operating and maintenance personnel. Such equipment may include high voltage current limiting fuses, high voltage line disconnect switches, alternative, selective and other control switches and contactors of the electromagnetically operated type, and associated control devices mounted in suitable metal cabinets or compartments that may be assembled to meet widely varying circuit control requirements and provided with separate access doors.

Although not limited thereto, such variously assembled enclosed circuit control equipment is particularly advantageous in high voltage, heavy duty, industrial motor control service.

In such service the assemblies may comprise high voltage, current limiting fused motor starters, spotters, reversers, and slow or fast speed or braking controllers adapted for squirrel cage, synchronous wound-rotor, or multispeed drive motors of various kinds of mills or machines operable under manual or automatic control in a wide range of industries, including steel, rubber, mining, paper, cement, water or sewage plants, and the like.

In such high voltage enclosed motor control assemblies, both separate access door locks with special keys and electrical switch interlocking are now in common use for insuring the safety of the operating and maintenance personnel as well as protecting the motor control equipment against misoperation. The interlock control wiring for the electrically operated switches or contactors can be easily varied to conform with varying assembly and functional arrangements of the components involved. However, such electrical interlocking may sometimes be improperly jammed or disabled by unskilled personnel in an attempt to save time or may fail, owing to some accidental ground or short circuiting of the interlocking or motor control wiring circuits. Thus, in many cases, particularly where the maximum safety of personnel and equipment and minimum machine "down time" are of prime importance, it has long been desirable that a more foolproof and effective mechanical interlocking of the doors and switches be substituted or added for backup protection of the electrical interlocking in order to minimize the dangers of both improper exposure of personnel to live parts and electrical failures. However, attempts at solution have resulted in increased space requirements with correspondingly increased costs, as well as undue complexity and difficulty in the varying installation of the door and switch mechanical interlocking to conform with varying assembly arrangements and functional requirements of the switching components.

The present invention overcomes such difficulties by providing combined door and switch interlocking mechanism of an improved reliable double function form capable of utilizing a push-pull flexibly sheathed cable that can be easily installed and run between compartments in a minimum space and due to its variable direction of movement, readily permits varying assembly arrangements of the interlocking mechanism for the access doors and switches to meet varying floor space and functional requirements, while always insuring only proper and safe access to the enclosed high voltage switches and other circuit control elements for any necessary adjustments, maintenance, replacement or repair, and mechanically preventing improper operation of the switches themselves, entirely free of electrical jamming possibilities as well as accidental grounds or shorts.

In carrying out the improved versatile double function door and switch interlocking principle of the present invention in a preferred form, each enclosure having a reversely movable circuit closing and opening switch mounted therein is provided with a separate access door. A common access door latching mechanism for the various switches involved in a motor circuit control system is provided with jointly movable elements for latching and unlatching each door, preferably as a particular one of the switches (for example an isolating switch) is closed and opened respectively. Each of the other switches is then provided with a door interlocking mechanism including a member reversely movable with the switch for locking and unlocking the common door latching mechanism when the switch is closed and opened, respectively. Finally, in order mechanically to interlock two or more of the other switches against simultaneous closure, a flexibly sheathed push-pull cable is run between compartments and has one end connected with the door locking member of one of the switch compartments so as to move in reverse directions in response to its locking and unlocking movements. The other end of the cable is provided with an interlock element disposed to have mutual transverse blocking relationship with the switch-to-door interlock member of the compartment of a related switch for preventing door locking movement of the interlocking member in either compartment following door-locking movement of the interlock in the other. Consequently, simultaneous closure of such switches is prevented since at any instant of time only one switch-to-door interlocking member can lock the common access door-locking mechanism and, therefore, only one of such switches may be closed at one time.

The improved versatile double function door and switch interlocking mechanism of the present invention may be applied with advantage in control installations involving either two, three, four or more switches in enclosures having separate access doors. For example, the invention may be utilized in motor control installations including a line disconnect switch together with motor starting and spotting switches, or with reversing contactors and a braking switch or with selective fast, slow and reverse motor control switches having separate enclosures. Due to the versatility, the door-locking member of any motor control switch enclosure, if desired, can be interlocked in accordance with the present invention to prevent closure of the particular switch enclosed therein when either of two other alternative or selective switches is closed to lock the access door latching mechanism, as well as to prevent the locking of the common access door control mechanism by either other switch, and therefore, the closure of such switch when the one switch is closed to lock the door-latching mechanism.

The novel features believed characteristic of the invention are set forth with particularity in the appended claims. The invention itself, however, together with further objects and advantages thereof may best be understood by referring to the following description taken in connection with the accompanying drawings.

Fig. 1 is a front view of a typical multiple tier cabinet assembly for enclosing high voltage three-phase motor control equipment to which the improved form of interlocking mechanism of the present invention may be applied, shown with several of the compartment access doors open to reveal the motor circuit control switches mounted therein. Fig. 2 is a side view of the left tier of the control assembly shown in Fig. 1, with portions of the enclosure wall broken away more clearly to reveal the common door latching mechanism. Fig. 3 is a partial sectional view on an enlarged scale, taken on the line 3—3 of Fig. 1, illustrating certain details of construction of the improved double function door and switch interlocking mechanism of the present invention in a preferred form. Fig. 4 is a front view of the partial control assembly shown in Fig. 3 with the doors and enclosure walls partially broken away to show the co-operating relation of the interlock mechanism with the common door latching mechanism, inside the cabinets. Figs. 5 and 6 are, respectively, a partial sectional view on the line 5—5 of Fig. 4 and a top view of the push-pull cable operating mechanism for the interlock element or bolt that has reciprocal transverse blocking relations with the door locking member of the right-hand enclosure shown in Fig. 4. Fig. 7 illustrates a modification embodying a double interlock element or bolt operating arrangement suitable for selectively interlocking between the door locking members of three enclosures, each having a circuit controlling switch mounted therein. Figs. 8, 9 and 10 show a further modification of the interlocking mechanism of the present invention suitable for interlocking between three switches assembled in compartments with separate access doors having a common door latching mechanism of the type shown in Fig. 1.

Referring now to Fig. 1, in an upper compartment C1 are mounted the current limiting short circuit protective fuses 10 and a three phase gang disconnect switch 11 for isolating from the power supply lines the fuses, main starting switches and associated metering and control devices. The arrangement is such as to permit removal and replacement of any blown fuse only when the isolating switch 11 and the access door DC1 are open as shown. The door latching and unlatching handle 12 carries an inner yoke 13 which may be moved into engagement with the pin 14 on the operating shaft 15 for closing the switch 11 only when the access door DC1 is closed. Upon movement of the handle 12 to its down position, projection 16 latches the door DC1 closed as shown in Fig. 2.

When the handle 12 is operated to its isolating switch closing and door latching position as just described, the bell crank arm 17, secured to the switch operating shaft 15, raises the door latching bar 18 to engage the latch 19 with the slotted bracket 20 carried on the inside of the access door DC2 of lower compartment C2, as shown in Fig. 2. In this manner, access to the three-phase high voltage motor starting switch or contactor 21 that is mounted in compartment C2 and connected in series with the isolating switch is prevented when the latter is closed.

The three-phase motor starting switch 21 is normally open and is electromagnetically operated to the motor circuit closing position by means of a suitable electromagnet 22 that may be energized and deenergized under either suitable manual push button or automatic control not shown. When energized, electromagnet 22 rotates the shaft 23 to close suitable three-phase switch contacts which in accordance with the standard practice may be provided with magnetic blowouts and removable arc chutes 24. Ordinarily overload protection for the motor circuit is provided so that the electromagnet 22 can be automatically deenergized by means of suitable motor overload responsive relays not shown. In any case, the reverse rotation of shaft 23 will open switch 21 whenever the operating electromagnet 22 is deenergized.

As the three-phase high voltage motor starting switch 21 is closed and opened, a bell crank arm 25 extending from the contact operating shaft 23 moves a link 26 to reversely rotate a motion amplifying bell crank 27 about its pivot pin 28. This pin 28 is mounted on a bracket 29 which extends from the frame of the three-phase motor starting switch 21 as shown more clearly in Fig. 3. A door-locking member 30 is pivotally connected by means of a slot to the long arm of bell crank 27 by the pin 31 and slides in suitable guides 32 to carry its bent over end 30a into and out of locking relation with the lower end of the door latching bar 18 as indicated by the dotted and full line positions illustrated in Fig. 4. Thus, whenever the motor starting switch 21 is closed, member 30 will slide under the lower end of bar 18 to lock the latch 19 in engagement with the slotted bracket 20, and also to lock the handle 12 in its down position, thereby to prevent opening of the isolating switch 11 as long as the motor starting switch 21 remains closed. At the same time both access doors DC1 and DC2 are locked closed by the locking member 30.

As shown in Fig. 1, an alternative electromagnetically operated three-phase motor circuit switch 33 is mounted in compartment C3. Switch 33 is preferably of substantially the same construction, as the switch 21 and, it will be understood, it is connected to be used alternatively therewith to energize the motor for slow speed inching or spotting operations of any mill driven thereby, as for example by supplying direct current successively to the motor three-phase windings from a suitable source, not shown, in a manner well known in the art. Thus, the inching or spotting switch 33 is reversely operable and provided as shown in Fig. 5 with a suitable bracket 29' for carrying a door latching mechanism locking member 30' that is of exactly the same construction as the door-latching mechanism locking member 30 of the switch 21 described above. Hence, the door-latching bar locking member 30' will be moved to its dotted line position as shown in Fig. 4, when the switch 33 is closed and to its full line position when the switch is open.

The latching bar 18' extending into compartment C3 carries a latch element 19' for engaging with the slotted latch bracket 20' to latch the door DC3 of compartment C3 in the same way as described in connection with the latching mechanism for door DC2. As shown in Fig. 1, the bar 18' is pivotally connected at its upper end to a slot in an arm 17' that is carried at the right-hand end of a shaft 35. The left-hand end of shaft 35 extends into compartment C1 and is connected by the arm 36 with the bar 18 so as to rotate shaft 35 and raise and lower bar 17' simultaneously whenever the bar 18 is raised and lowered. Consequently, the door DC3 will be latched closed simultaneously with the latching of the door DC2 whenever the isolating switch 11 is closed and door DC1 is latched.

In order to interlock mechanically against simultaneous closure of the motor starting switch 21 and the motor spotting switch 33, the improved double function form of door and switch interlocking mechanism of the present invention is provided. As shown on an enlarged scale in Figs. 3 and 4, this comprises the flexibly sheathed push-pull cable 37 that extends through the opening 38 into both compartment C2 and compartment C3. The end of the sheath of the cable in compartment C2 is fixedly mounted by means of a bracket 39 that is secured to the sheath by the adjustable nuts 40 and is fixedly mounted on the bracket 29 by the fastening screws 41. The end of the cable 37 is secured to the lug 31a of the link pin 31 by the adjusting nuts 42. Therefore, the cable will be reversely moved jointly with the door latch locking member 30 which, in turn, moves jointly with the reversely movable contacts of the motor-starting switch 21 as previously explained.

The other end of the sheath of the push-pull cable 37 in compartment C3 is secured to a supporting plate 43 by the adjustable nuts 44. The plate 43 is carried by the bracket 29' mounted on the frame of the motor-spotting switch 33, the plate preferably being secured by the same bolts 32a' that secure the guides 32' for the door latch locking member 30'. As shown in Fig. 5 these same bolts also serve to mount the arm 45 that carries the guide 46 for the interlock element or bolt 47. The bent over upper end of the interlock element or bolt 47 is secured to the end 37b of the push-pull cable 37 by means of the adjustable nuts 48.

As shown more clearly in the right-hand portion of Fig. 3, and in Fig. 5, the locking member 30' is provided with a aperture 49 for receiving, as indicated by the dotted lines in Fig. 5, the upturned end 47a of the interlock element 47 only when the locking member 30' is in its non-interfering position as shown in Figs. 3 and 4. Such movement of the end 47a of interlock element 47 into the aperture 49 will occur when the end 37a of the push-pull cable is moved jointly with the door latch locking member 30 as the latter slides to its locking position as indicated by the dotted line in Fig. 4 upon closure of the motor-starting switch 21. Consequently, when the motor-starting switch 21 is closed, the interlock element or bolt 47 is in its dotted line position shown in Fig. 5, and closure of the motor-spotting switch 33 is effectively prevented.

Conversely, if the motor-spotting switch 33 is closed so as to move jointly therewith, the door-locking member 30' to its dotted line position as shown in Fig. 4 and indicated in Fig. 6, the aperture 49 is moved to the right out of the path of the end 47a of interlock element or bolt 47 so that the latter is blocked by an unapertured portion of member 30'. Consequently, the interlock element 30' and push-pull cable 37 together with the bell crank 27 and link 26 serve mechanically to prevent closure of the motor-starting switch 21 whenever the motor-spotting switch 33 is closed.

Therefore, it will be seen that the interlock element 47 and the door-locking member 30' have a reciprocal-blocking relation such that when either switch 21 or switch 33 is closed, simultaneous closure of the other switch is mechanically prevented. Furthermore, it should be noted that when either the switch 21 or switch 33 is closed, a corresponding one of the latch bars 18 of 18' is locked in its raised position, thereby preventing movement of the handle 12 to open the isolating switch 11. At the same time, all of the access doors DC1, DC2 and DC3 will be locked in their closed positions. Thus, only when both the motor-starting switch 21 and the motor-spotting switch 33 are open, is it possible to operate the handle 12 to open the disconnect switch 11 and unlatch the doors DC1, DC2 and DC3 to permit access to the motor circuit controlling equipment mounted in the corresponding compartments C1, C2 and C3.

Owing to its inherent flexibility, the push-pull cable 37 is adapted to be easily run in a minimum space and mounted by suitable brackets 50 inside the compartments so as to be out of the way. Also in case the switches 21 and 33 are of the removable rollout type, it is a relatively simple matter to disconnect the sheath end of the cable from either of the switches whenever removal thereof becomes necessary. Thus, by simply removing the link pin 31 and the mounting bracket 39, the push-pull cable can be readily freed from the switch 21. Likewise, removal of the bolts 32a' will free the other end of the cable from switch 33, both without impairing the relative adjustment of the cable and cooperating interlocking parts.

In the modification shown in Fig. 7, the rod 51 serves to interconnect the end 37b of the push-pull cable 37 to operate a second interlock element 47' simultaneously with the interlock element or bolt 47. The interlock element 47' has reciprocal blocking relations with the door-locking member 52 that, it will be understood, is operated and functions in compartment C4 in precisely the same manner as the door-locking members 30 and 30' in compartments C2 and C3 respectively. The threaded stud 53 and adjustable nuts 54 and 55 permit any necessary relative adjustment of the interlock elements 47 and 47'. The spring 56 serves to balance out the added weight of the parts.

Fig. 8 shows the principles of the present invention applied to an interlocking mechanism suitable for interlocking between three switches 60, 61 and 62 assembled in compartments with separate access doors having a common door-latching mechanism of the type shown in Fig. 1. As shown in Fig. 8, the combined interlocking mechanism indicated generally by the reference character 63 is mounted in the compartment in which the circuit control switch 60 is mounted, with the link 64 interconnected with the switch 60 so as to be moved in opposite directions as the switch is opened and closed, in the same way as the link 26 shown in Fig. 3. The reciprocating link 64 is pivotally connected to operate the bell crank 65 about its pivotal mounting pin 66, and thereby slide the locking member 67 in the guide 68 into and out of locking relation with the common door-latching mechanism for the access door of the compartment enclosing the switch 60 depending upon whether the switch 60 is closed or opened.

The end of the reciprocating link 64 slides in the guide 69 in reciprocal-blocking relation with the member 70 that slides in the guide 71. Thus, when the switch 60 is closed and the link 64 is moved in the direction indicated by the arrow, the free end of the link will pass through the slot 72 in the sliding member 71, only when the slot is in alignment with the end of the link 64.

As more clearly illustrated in Fig. 9, the sliding member 70 is joined as by welding with an L-shaped sliding member 73, one leg of which slides in the guide 74 and the end of the other leg of which is operatively connected with the end of the push-pull cable 75 that, it will be understood, is connected to move jointly with the locking member for the door-latching mechanism for the access door of the compartment in which the switch 61 is mounted. The sheath of the push-pull cable 75 is fixedly mounted on the bracket 76 by means of the adjustable nut 77.

The sliding interlocking member 73 is provided with a slot 78 that is aligned to receive one end of a U-shaped sliding locking member 79 when the slot 72 is similarly aligned with the end of the link 64, only when the switch 61 is opened. Thus the sliding members 73 and 79 are in similar reciprocal-blocking relation.

The sliding member 79 has one leg sliding through suitable guides formed in the supporting plate 80, and the other leg sliding in the guide 81 and having its bent-over end connected by means of the adjustable nut 82 to be moved in reverse direction by the end of a push-pull cable 83.

It will be understood that the push-pull cable 83 is connected to move jointly with the switch 62 and its corresponding locking member for the common door-latching mechanism in the same manner as previously described. The sheath of the push-pull cable is fixed by means of the adjustable nut 84 to the supporting plate 80. The push-pull cable 83 also operates the U-shaped sliding interlocking member 85, the shorter leg of which slides in suitable guide openings formed in the supporting plate 80, and the longer leg of which slides in the guide 86. The end of the shorter leg of the interlocking member 85 is aligned to be received into the slot 87 formed in the locking member 67 only when the switch 60 is in the open position as indicated in the drawing. It will be understood that the push-pull cable 83 is connected to move jointly with the door-locking member and the switch 61 in the same manner as previously described and shown in the left-hand side of Fig. 3.

As shown in Figs. 8, 9, and 10, all of the switches 60, 61 and 62 are in their open positions with their corresponding door-locking members retracted out of locking relation with the common door-latching mechanism, of all of the access doors of the compartment in which these switches are enclosed in a manner similar to that shown in Fig. 1. Under these conditions, the common door-latching mechanism may be operated to latch all these access doors at the same time that the main disconnect switch is closed. Conversely, all of the access doors will be unlatched only when the disconnect switch is opened. Assuming that the disconnect switch is closed and the common door-latching mechanism is in position to latch all of the access doors, upon operation of the switch 60 to its closed position, the door latch locking member 67 will therefore be moved into locking relation with the common door-latching mechanism. Such movement of the locking member will carry the slot 87 out of alignment with the end of the sliding member 85 and thereby effectively block the movement of the push-pull cable 83 that would occur in case switch 62 is closed. In this way, when switch 60 is closed, the simultaneous closure of switch 61 is effectively prevented.

At the same time, the end of the sliding link 64 will be projected into the slot 72 thereby effectively preventing movement of the push-pull cable 75 that would be required for closure of the switch 61. Consequently, whenever switch 60 is closed, simultaneous closure of switch 61 is effectively prevented.

On the other hand, with all the switches 60, 61 and 62 open, whenever switch 61 is closed, the slots 72 and 78 will be moved out of alignment with the end of the sliding members 64 and 79, thereby effectively preventing simultaneous closure of either switch 60 or switch 62 as long as the switch 61 remains closed.

Similarly, with all switches open, whenever switch 62 is closed, the push-pull cable 83 transmits motion to slide the interlocking members 79 and 85 into their corresponding slots 78 and 87, thereby effectively preventing simultaneous closure of the switches 60 and 61 as long as the switch 62 remains closed.

It will be understood that whenever any one of the switches 60, 61 and 62 is closed, the corresponding locking member is operated to lock the common door-latching mechanism and the other switches cannot be closed simultaneously therewith. Thus, these switches 60, 61 and 62 respectively may be the forward-reverse-brake switches, or fast-slow and reverse switches in a motor control system.

While I have shown and described particular embodiments of my invention, it will be obvious to those skilled in the art that various changes and modifications may be made without departing from the scope of my invention in its broader aspects, and I, therefore, intend in the appended claims to cover all such changes and modifications as fall within the true spirit and scope of my invention.

What I claim and desire to secure by Letters Patent of the United States is:

1. In combination, a plurality of circuit closing and opening switches, enclosing means therefor providing a separate access door for each switch, a common access door-latching mechanism having jointly movable elements for latching and unlatching all said doors, a plurality of locking members, each mechanically connected to a corresponding one of said switches and actuated thereby for locking and unlocking said door latching mechanism as said corresponding switch is closed and opened respectively, and interlocking mechanism for preventing contemporaneous closure of two of said switches comprising a movable interlock member cooperating with the door latch locking member of one of said switches to block movement of either of said cooperating members by prior movement of the other and a mechanical driving connection between said interlock member and said door latch locking member of another of said switches.

2. In combination, a plurality of circuit closing and opening switches, enclosing means therefor providing a separate access door for each switch, a common access door control mechanism having jointly movable elements for latching and unlatching all said doors, a plurality of locking members, each mechanically connected to a corresponding one of said switches and actuated thereby for locking and unlocking said door latching mechanism as said corresponding switch is closed and opened respectively, and interlocking mechanism including a plurality of interlocking elements, means mounting said interlocking elements for movement in paths intersecting the paths of said locking members and each of said interlocking elements having a connection with a corresponding locking member to move jointly therewith for preventnig locking movement of the remaining locking members upon locking movement of any one locking member thereby to prevent simultaneous closing of any two of said switches.

3. In combination, a plurality of circuit closing and opening switches, enclosing means therefor providing a separate access door for each switch, a manually operable access door control mechanism having jointly movable elements for latching and unlatching all said doors, a plurality of locking members, each mechanically connected to a corresponding one of said switches and actuated thereby for locking and unlocking said door control mechanism as the switch is closed and opened respectively, and interlocking mechanism including a plurality of interlocking elements, means mounting said interlocking elements for movements in paths transverse to the paths of said locking members and each of said interlocking elements having a push-pull cable connection with a corresponding locking member to move jointly therewith for preventing locking movement of the remaining locking members following the locking movement of any one of said members thereby to prevent simultaneous closing of any two said switches.

4. In a compartmented switch assembly, a plurality of circuit closing and opening switches, each having a separate access door, a first of the switches having a common access door control mechanism including jointly movable elements for latching and unlatching all of said doors as the first switch is closed and opened respectively while the other switches are open, means including a plurality of locking members, each mechanically connected to a corresponding one of the other switches and actuated thereby for locking said door control mechanism to maintain all doors latched when any one of said other switches is closed while said first switch is closed, and interlocking mechanism for preventing locking movement of the remaining contemporaneous closure of two of said other switches comprising a movable interlock member cooperating with the door latch locking member of one of said other switches to block movement of either of said cooperating members by prior movement of the other and a mechanical driving connection between said interlock member and said door latch locking member of another of said other switches.

5. In a compartmented switch assembly, a plurality of circuit closing and opening switches, each having a separate access door, one of said switches having manual operating means and a common access door control mechanism including jointly movable elements for latching and unlatching all of said doors in response to the opening and closing respectively of said one switch while the other switches are open, means including a plurality of locking members each mechanically connected to a corresponding one of the others of said switches and actuated thereby for locking said door control mechanism to maintain all doors latched when any one of said other switches is closed while said one switch is closed, and interlocking mechanism for preventing contemporaneous closure of two of said other switches comprising a movable interlock member cooperating with the door latch locking member of one of said other switches and means mounting said cooperating members for movement in intersecting paths to provide for blocking the movement of either by prior movement of the other and a push-pull cable connection between said interlock member and the door latch locking member of another of said switches.

6. In combination, two reversely movable circuit closing and opening switches, enclosing means therefor providing a separate access door for each switch, a common access door-latching mechanism having jointly movable elements for latching and unlatching both said doors, door-locking means including a separate reversely movable locking member mechanically connected to each switch and actuated thereby to lock and unlock said latching mechanism when the corresponding switch is closed and opened respectively, and interlocking means for preventing contemporaneous closure of said switches comprising a reversely movable interlock member cooperating with the door latch locking member of one of said switches to block movement of either of said cooperating members by prior movement of the other and a reversely movable mechanical connection between said interlock member and the door latch locking member of the other of said switches.

7. In combination, two reversely movable circuit-closing and opening switches each having an enclosure provided with an access door, a common access door-latching mechanism having jointly movable elements for latching and unlatching both said doors, door-locking means including a pair of locking members each having reversely movable connections with a corresponding one of said switches to lock and unlock said latching mechanism when the corresponding switch is closed and opened respectively and interlocking means including a flexible push-pull cable assembly having each of its ends connected with a different one of said locking members for preventing locking movement of one of said members following locking movement of the other.

8. In combination, a pair of enclosures having separate access doors, a common access door-latching mechanism having jointly movable elements for latching and unlatching both said doors, each of said enclosures having a reversely movable circuit-closing and opening switch mounted therein and provided with means comprising a reversely movable member connected to the switch and actuated thereby for locking and unlocking said latching mechanism in response to the closing and opening respectively of said switch, and switch-interlocking means including a flexible cable extending into each enclosure and having one end connected to the locking member in one of said enclosures to effect reverse movement of the cable jointly therewith and having its other end provided with an interlock element disposed with respect to the locking member in the other of said enclosures to effect blocking of either by prior movement of the other to prevent door-locking movement of each member when the other member is in door-locking position thereby to prevent simultaneous closing of said switches.

9. In combination, two reversely-movable circuit closing and opening switches, each having an enclosure provided with an access door, a manually controlled common access door-latching mechanism having jointly movable elements for latching and unlatching both said doors, means including a plurality of reversely movable locking members one for each of said switches and each mechanically connected to its corresponding switch and actuated thereby to lock and unlock the said common latching mechanism when the door is latched and the corresponding circuit is closed and opened respectively, and interlocking means for preventing the contemporaneous closure of said switches comprising a pair of interlock members cooperating with each other to block movement of either by the prior movement of the other, a pair of mechanical connection members each having one of its ends connected to a corresponding one of said locking members and its other end connected to a corresponding one of said cooperating interlock members.

10. In combination, a plurality of adjacent enclosures having separate access doors, a common access door-latching mechanism having jointly movable elements for latching and unlatching both said doors, each of said enclosures having a reversely movable circuit closing and opening switch mounted therein and provided with means including a reversely movable member connected to the switch and actuated thereby for locking and unlocking said latching mechanism when the circuit is closed and opened respectively, one of said members having an aperture, and switch interlocking means including a reversely movable element having a connection at one end with another locking member to move jointly therewith, and the other end provided with connections including a bolt movable through the aperture in the one member only in the unlocking position thereof for preventing locking movement of each member upon prior locking movement of the other member thereby to prevent simultaneous closing of said switches.

References Cited in the file of this patent
UNITED STATES PATENTS

| | | |
|---|---|---|
| 2,363,364 | Rugg | Nov. 21, 1944 |
| 2,381,243 | Armstrong | Aug. 7, 1945 |
| 2,443,664 | Rothfus | June 22, 1948 |
| 2,531,157 | Pifke | Nov. 2, 1950 |
| 2,542,853 | Wills | Feb. 20, 1951 |
| 2,646,474 | Stratton | July 21, 1953 |
| 2,791,729 | Allen | May 7, 1957 |

OTHER REFERENCES

E.M. Synchronizer 200 sny–46, pp. 10–15.